US012670243B2

(12) United States Patent
Moreno et al.

(10) Patent No.: US 12,670,243 B2
(45) Date of Patent: Jun. 30, 2026

(54) SYSTEMS AND METHODS FOR SIDE-CHANNEL MONITORING OF A PROCESSOR CONNECTED TO A COMMUNICATION NETWORK

(71) Applicant: Palitronica Inc., Kitchener (CA)

(72) Inventors: Carlos Moreno, Waterloo (CA); Sebastian Fischmeister, Waterloo (CA); Murray Dunne, Waterloo (CA)

(73) Assignee: Palitronica Inc.

( * ) Notice: Subject to any disclaimer, the term of this patent is extended or adjusted under 35 U.S.C. 154(b) by 205 days.

(21) Appl. No.: 18/224,214

(22) Filed: Jul. 20, 2023

(65) Prior Publication Data

US 2025/0028814 A1     Jan. 23, 2025

(51) Int. Cl.
G06F 21/00          (2013.01)
G06F 21/52          (2013.01)

(52) U.S. Cl.
CPC ..................................... G06F 21/52 (2013.01)

(58) Field of Classification Search
CPC ....................................................... G06F 21/52
See application file for complete search history.

(56) References Cited

U.S. PATENT DOCUMENTS

| | | | |
|---|---|---|---|
| 5,659,312 A | 8/1997 | Sunter et al. | |
| 5,778,030 A | 7/1998 | Bruckert et al. | |

| | | | |
|---|---|---|---|
| 6,342,350 B1 | 1/2002 | Tanzi et al. | |
| 6,469,049 B1 | 10/2002 | Meyerhoff et al. | |
| 6,620,621 B1 | 9/2003 | Cohenford et al. | |
| 7,188,258 B1 | 3/2007 | Aggarwal et al. | |
| 8,332,945 B2 | 12/2012 | Kim | |
| 8,522,052 B1 | 8/2013 | Lesea | |
| 8,548,219 B2 | 10/2013 | Ortyn et al. | |

(Continued)

OTHER PUBLICATIONS

Checkoway, S., McCoy, D., Kantor, B., Anderson, D., Shacham, H., Savage, S., Koscher, K., Czeskis, A., Roesner, F. and Kohno, T., Aug. 2011, Comprehensive experimental analyses of automotive attack surfaces. In USENIX Security Symposium (vol. 4, pp. 447-462).

(Continued)

*Primary Examiner* — Jeffrey C Pwu
*Assistant Examiner* — Thong P Truong
(74) *Attorney, Agent, or Firm* — Smart & Biggar

(57)          ABSTRACT
Systems and methods for monitoring at least one device processor connected to a communication network are disclosed. The methods involve operating at least one monitoring processor to transmit at least one communication of at least one test message to a device processor via the communication network; for each communication, generating a program trace signal of the device processor in response to the communication; and operating the monitoring processor to: for each communication, collect a program trace signal generated by the device processor in response to the communication; compare the at least one program trace signal to an expected response of the device processor for the at least one test message to determine whether the at least one program trace signal corresponds to the expected response; and in response to determining that the at least one program trace signal does not correspond to the expected response, generate an anomaly notification.

18 Claims, 4 Drawing Sheets

(56)                References Cited

U.S. PATENT DOCUMENTS

| | | | |
|---|---|---|---|
| 8,892,903 | B1 | 11/2014 | Trimberger |
| 9,268,938 | B1 | 2/2016 | Aguayo-Gonzalez et al. |
| 9,430,644 | B2 | 8/2016 | Aguayo-Gonzalez |
| 9,444,618 | B1 | 9/2016 | Trimberger et al. |
| 9,654,158 | B2 | 5/2017 | Dafesh et al. |
| 10,007,786 | B1 | 6/2018 | Bhatkar et al. |
| 10,264,440 | B2 | 4/2019 | Dishon et al. |
| 10,395,032 | B2 | 8/2019 | Keller et al. |
| 10,430,263 | B2 | 10/2019 | Polar Seminario |
| 11,119,127 | B2 | 9/2021 | Moreno |
| 11,588,831 | B2 | 2/2023 | Moreno et al. |
| 11,630,135 | B2 | 4/2023 | Moreno |
| 11,632,313 | B2 | 4/2023 | Moreno et al. |
| 2003/0160154 | A1 | 8/2003 | Arnold et al. |
| 2004/0078690 | A1 | 4/2004 | Kohashi |
| 2007/0258898 | A1 | 11/2007 | Ballinger et al. |
| 2008/0021834 | A1 | 1/2008 | Holla et al. |
| 2008/0028468 | A1 | 1/2008 | Yi et al. |
| 2008/0113872 | A1 | 5/2008 | Schuren et al. |
| 2009/0012387 | A1 | 1/2009 | Hanson et al. |
| 2009/0322510 | A1 | 12/2009 | Berger et al. |
| 2010/0100964 | A1 | 4/2010 | Mahaffey et al. |
| 2010/0104191 | A1 | 4/2010 | McGwire |
| 2010/0237854 | A1 | 9/2010 | Kumhyr et al. |
| 2010/0281309 | A1 | 11/2010 | Laurenti et al. |
| 2010/0313270 | A1 | 12/2010 | Kim et al. |
| 2011/0183733 | A1 | 7/2011 | Yoshida et al. |
| 2011/0184580 | A1 | 7/2011 | Kawamoto et al. |
| 2011/0184585 | A1 | 7/2011 | Matsuda et al. |
| 2011/0185196 | A1 | 7/2011 | Asano et al. |
| 2011/0234307 | A1 | 9/2011 | Marinet et al. |
| 2012/0029336 | A1 | 2/2012 | Terada et al. |
| 2012/0029718 | A1 | 2/2012 | Davis |
| 2012/0244145 | A1 | 9/2012 | Sampson et al. |
| 2012/0265487 | A1 | 10/2012 | Yanine et al. |
| 2013/0024382 | A1 | 1/2013 | Dala et al. |
| 2014/0167704 | A1 | 6/2014 | Lafontaine et al. |
| 2014/0334653 | A1 | 11/2014 | Luna |
| 2014/0335043 | A1 | 11/2014 | Chon et al. |
| 2014/0371081 | A1 | 12/2014 | Badve et al. |
| 2015/0097729 | A1 | 4/2015 | Subburaj et al. |
| 2015/0279648 | A1 | 10/2015 | Furtaw et al. |
| 2015/0317475 | A1 | 11/2015 | Aguayo-Gonzalez et al. |
| 2015/0381364 | A1 | 12/2015 | Al-Somani |
| 2016/0041574 | A1 | 2/2016 | Maitani et al. |
| 2016/0117503 | A1 | 4/2016 | Reed et al. |
| 2016/0226892 | A1 | 8/2016 | Sen et al. |
| 2016/0327596 | A1 | 11/2016 | Salajegheh et al. |
| 2017/0060175 | A1 | 3/2017 | Waugh |
| 2017/0080249 | A1 | 3/2017 | Brawn et al. |
| 2017/0111069 | A1 | 4/2017 | Dafesh et al. |
| 2017/0149572 | A1 | 5/2017 | Wallrabenstein |
| 2017/0185770 | A1 | 6/2017 | Guri et al. |
| 2017/0234979 | A1 | 8/2017 | Mathews et al. |
| 2017/0343695 | A1 | 11/2017 | Stetson et al. |
| 2017/0351848 | A1 | 12/2017 | Bakish |
| 2018/0137270 | A1 | 5/2018 | Moreno et al. |
| 2018/0299464 | A1 | 10/2018 | Li et al. |
| 2019/0253439 | A1 | 8/2019 | Payton |
| 2020/0366692 | A1 * | 11/2020 | Moreno ................ H04L 63/123 |
| 2023/0300154 | A1 | 9/2023 | Moreno et al. |

OTHER PUBLICATIONS

Cho, K.T. and Shin, K.G., 2016. Fingerprinting electronic control units for vehicle intrusion detection. In 25th {USENIX} Security Symposium ({USENIX} Security 16) (pp. 911-927).

Cho, K.T. and Shin, K.G., Oct. 2017, Viden: Attacker identification on in-vehicle networks. In Proceedings of the 2017 ACM SIGSAC Conference on Computer and Communications Security (pp. 1109-1123).

Groza, B., Murvay, S., Herrewege, A.V. and Verbauwhede, I., 2017. Libra-can: Lightweight broadcast authentication for controller area networks. ACM Transactions on Embedded Computing Systems (TECS), 16(3) (pp. 1-28).

Kneib, M. and Huth, C., Jan. 2018, Scission: Signal characteristic-based sender identification and intrusion detection in automotive networks. In Proceedings of the 2018 ACM SIGSAC Conference on Computer and Communications Security (pp. 787-800).

Koscher, K., Czeskis, A., Roesner, F., Patel, S., Kohno, T., Checkoway, S., McCoy, D., Kantor, B., Anderson, D., Shacham, H. and Savage, S., May 2018, Experimental security analysis of a modern automobile. In 2010 IEEE Symposium on Security and Privacy (16 pages).

Brown, D.A., Cooper, G., Gilvarry, I., Grawrock, D., Rajan, A., Tatourian, A., Venugopalan, R., Vishik, C., Wheeler, D., Zhao, M. and Clare, D., 2015. Automotive security best practices: recommendations for security and privacy in the era of the next-generation car. White Paper, McAfee Inc, 62 (23 pages).

Miller, C. and Valasek, C., 2015. Remote exploitation of an unaltered passenger vehicle. Black Hat USA, 2015 (pp. 1, 5-6, 87-88).

Miller, C. and Valasek, C., 2016. Advanced CAN injection techniques for vehicle networks. YouTube [online] [video]. Presentation at BlackHat USA. [retrieved on May 21, 2020]. Retrieved from </https://www.youtube.com/watch?v=4wgEmNlu20c> (33 pages).

Mukherjee, S., Shirazi, H., Ray, I., Daily, J. and Gamble, R., Dec. 2016, Practical DOS attacks on embedded networks in commercial vehicles. In International Conference on Information Systems Security (pp. 23-42), Springer, Cham.

Murvay, P.S. and Groza, B., 2014. Source identification using signal characteristics in controller area networks. IEEE Signal Processing Letters, 21(4) (4 pages).

Petit, J. and Shladover, S.E., 2014. Potential cyberattacks on automated vehicles. IEEE Transactions on Intelligent transportation systems, 16(2) (10 pages).

Pike, L., Sharp, J., Tullsen, M., Hickey, P.C. and Bielman, J., May 2015, Securing the automobile: A comprehensive approach. In Embedded Security in Cars (ESCAR) Conference (10 pages).

CAN Specification, Version 2.0, Sep. 1991, Robert Bosch GmbH, Stuttgart, Germany (72 pages).

Surface Vehicle Recommeded Practice—Cybersecurity Guidebook for Cyber-Physical Vehicle Systems, J3061, Jan. 2016 (pp. 1-6), SAE International.

Sagong, S.U., Ying, X., Clark, A., Bushnell, L. and Poovendran, R., Apr. 2018, Cloaking the clock: emulating clock skew in controller area networks. In 2018 ACM/IEEE 9th International Conference on Cyber-Physical Systems (ICCPS) (pp. 32-42), IEEE.

Van Herrewege, A., Singelee, D. and Verbauwhede, I., Nov. 2011, CANAuth—a simple, backward compatible broadcast authentication protocol for CAN bus. In ECRYPT Workshop on Lightweight Cryptography (vol. 2011) (7 pages).

Soll, Korak, et al., EM-Based Detection of Hardware Trojans of FPGAs, IEEE 2014 (Year 2014).

Boggs, Chau and Cui, Utilizing Electromagnetic Emanations for Out-of-Band Detection of Unknown Attack Code in a Programmable Logic Controller, Proceedings of SPIE Defense + Security 2018, Ontario Florida, US. (Year 2018).

Liu et al., On Code Execution Tracking via Power Side-Channel, ACM 2016 (Year 2016).

Moreno et al., On the Security of Safety-critical Embedded Sysems: Who Watches the Watchers? Who Reprograms the Watchers?, 3rd int'l Conf on Information Systems Security and Privacy, 2017 (6 pages).

Carlos Moreno, Sebastian Fischmeister, and M. Anwar Hasan: Non-Intrusive Program Tracing and Debugging of Deployed Embedded Systems Through Side-Channel Analysis. LCTES ( 2013) (11 pages).

Mehari Msgna, Konstantinos Markantonakis, and Keith Mayes: The B-Side of side channel leakage: control flow security in embedded systems. T. Zia et al. (Eds.): SecureComm 2013, LNICST 127, pp. 288-304, 2013.

Shane S. Clark et al: WattsUpDoc: Power Side Channels to Nonintrusively Discover Untargeted Malware on Embedded Medical Devices. USENIX Workshop on Health Information Technologies (2013) (11 pages).

(56)  References Cited

OTHER PUBLICATIONS

Eisenbarth et al. Building a Side Channel Based Disassembler. M.L. Gavrilova et al. (Eds.): Trans on Comput. Sci. X. LNCS 6340, pp. 78-99, 2010.

Kocher P., Jaffe J., Jun B. (1999) Differential Power Analysis. In: Wiener M. (eds) Advances in Cryptology—CRYPTO'99. CRYPTO 1999. Lecture Notes in Computer Science, vol. 1666. Springer, Berlin, Heidelberg. https://doi.org/10.1007/3-540-48405-1_25 (10 pages).

Callan, R., Zajic, A. and Prvulovic, M. Fase: finding amplitude-modulated side-channel emanations. In 2015 ACM/IEEE 42nd Annual Internationl Symposium on Computer Architecture (ISCA) Jun. 2015 (pp. 592-603). IEEE.

Belgarric, P., Bhasin, S.. Bruneau, N., Danger, J.L., Debande, N., Guilley, S., Heuser, A., Najm, S. and Rioul, O. Time-frequency analysis for second-order attacks. In International Conference on Smart Card Research and Advanced Applications, Springer, Cham, Nov. 2013. (pp. 108-122).

Intrusion detection, Wikipedia [online]. https://en.wikipedia.org/wiki/Intrusion_detection_system [retrieved on May 19, 2023] (12 pages).

Security information and event management, Wikipedia [online]. https://en.wikipedia.org/wiki/Security_information_and_event_management [retrieved on May 19, 2023] (11 pages).

Volokitin, S., Black box fuzzing with side channels, hardwear.io Hardware Security Conference and Training, Oct. 24-28, 2022 (40 pages).

* cited by examiner

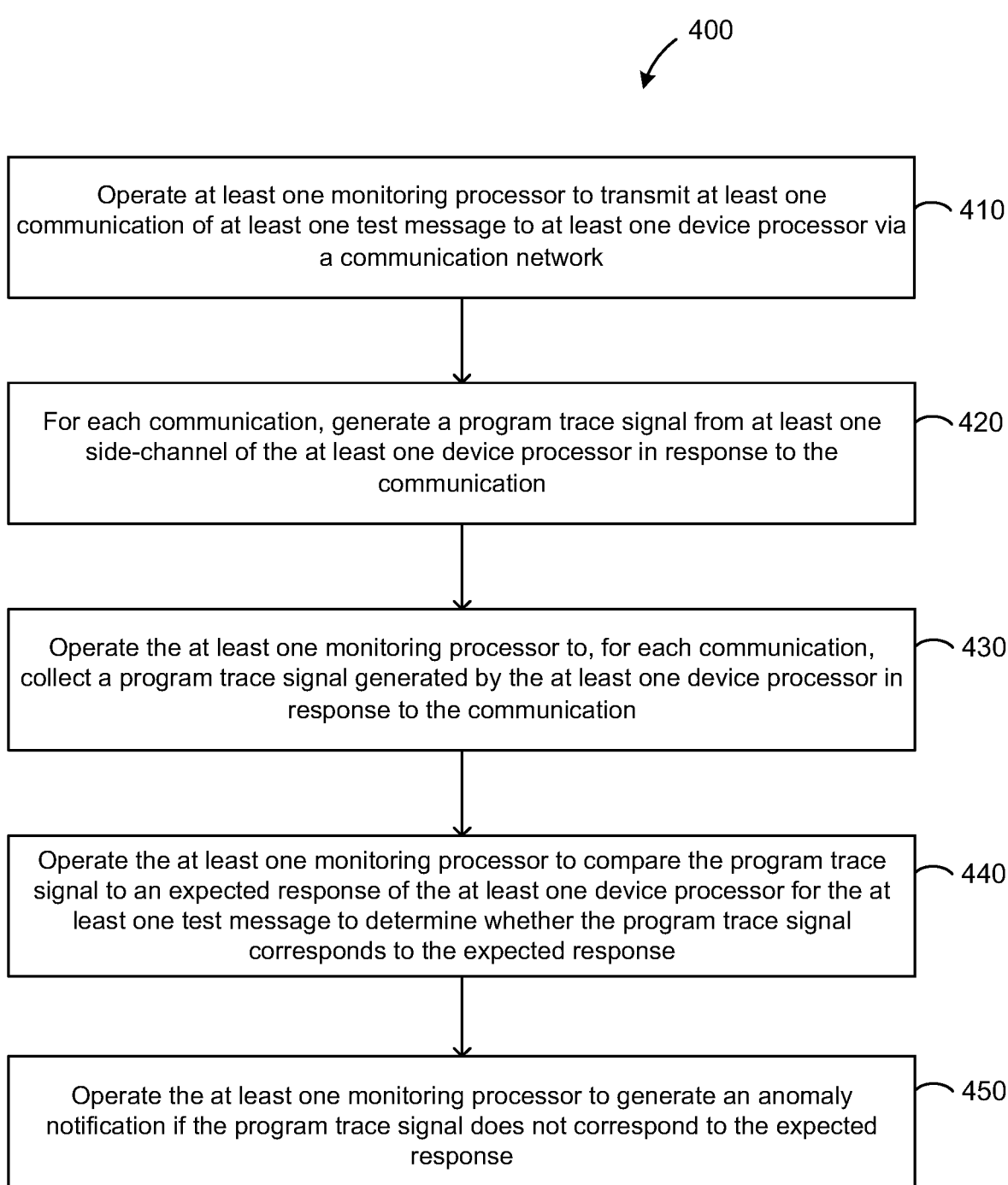

400

Operate at least one monitoring processor to transmit at least one communication of at least one test message to at least one device processor via a communication network — 410

For each communication, generate a program trace signal from at least one side-channel of the at least one device processor in response to the communication — 420

Operate the at least one monitoring processor to, for each communication, collect a program trace signal generated by the at least one device processor in response to the communication — 430

Operate the at least one monitoring processor to compare the program trace signal to an expected response of the at least one device processor for the at least one test message to determine whether the program trace signal corresponds to the expected response — 440

Operate the at least one monitoring processor to generate an anomaly notification if the program trace signal does not correspond to the expected response — 450

FIG. 4

SYSTEMS AND METHODS FOR SIDE-CHANNEL MONITORING OF A PROCESSOR CONNECTED TO A COMMUNICATION NETWORK

FIELD

The embodiments described herein relate to the field of computing systems, and in particular, side-channel analysis of computing systems for security, safety, and development.

BACKGROUND

Security and safety can be essential aspects of computing systems, especially safety-critical systems, and in view of the ever-increasing connectivity of such systems. Traditionally, safety-critical systems have used run time monitoring techniques to enforce security and safety properties during operation. However, monitoring security and safety properties poses unique challenges. The functionality of safety-critical systems should not be disrupted by such monitoring. In addition, firmware reprogramming can bypass a monitoring tool if it runs alongside the monitored and vulnerable system. Furthermore, if malware runs on the same processor as the monitoring tool, then malware can "fake" behaviors that the monitoring tool will consider acceptable.

Many safety-critical computing systems can be connected to a local communication network, to which a plurality of other electronic devices are also connected. Cybersecurity may not have been a significant concern for such systems if they had little or no connectivity to the outside world. However, with growing connectivity, the importance of cybersecurity for such systems is of increasing concern.

Some aspects of cybersecurity can involve evaluating electronic devices to discover vulnerabilities such as hidden commands, backdoors, corner cases, or undocumented functionality. In software applications, fuzzing techniques can be used to discover vulnerabilities. Fuzzing involves generating many normal and abnormal inputs to a target device and then monitoring the resulting execution states to detect exceptions to normal behaviour. However, fuzzing techniques are infeasible in black-box hardware environments in which execution states are typically opaque.

SUMMARY

The various embodiments described herein generally relate to side-channel monitoring systems and methods of operating thereof. The disclosed methods and systems can relate to evaluating computing systems to discover undocumented functionality.

In accordance with an example embodiment, a system for monitoring at least one device processor connected to a communication network is provided. The system includes at least one detector operable to generate a program trace signal from at least one side-channel of the at least one device processor; a communication component to provide access to the communication network; and at least one monitoring processor in communication with the communication component and the at least one detector. The at least one monitoring processor is operable to: transmit at least one communication of at least one test message to the at least one device processor via the communication network; for each communication, collect a program trace signal generated by the at least one device processor in response to the communication; compare the at least one program trace signal to an expected response of the at least one device processor for the at least one test message to determine whether the at least one program trace signal corresponds to the expected response; and in response to determining that the at least one program trace signal does not correspond to the expected response, generate an anomaly notification.

In some embodiments, the at least one monitoring processor can be operable to: determine whether at least one nominal channel of the at least one device processor is responsive to the communication; and in response to determining that at least one nominal channel is responsive to the communication, determine that the at least one program trace signal corresponds to the expected response.

In some embodiments, the at least one nominal channel can include one or more of an input of the at least one device processor or an output of the at least one device processor.

In some embodiments, the at least one monitoring processor can be operable to: determine whether the at least one program trace signal corresponds to an expected program trace signal of the at least one device processor for the test message; and in response to determining that the at least one program trace signal does not correspond to the expected program trace signal, determine that the at least one program trace signal does not correspond to the expected response.

In some embodiments, the expected program trace signal can be a program trace signal of the at least one device processor when the at least one device processor is idle.

In some embodiments, the at least one monitoring processor can be operable to: transmit a plurality of communications of a plurality of preliminary messages to the communication network, the plurality of preliminary messages intended to cause the at least one device processor to be idle; collect a plurality of preliminary program trace signals generated by the at least one device processor in response to the plurality of communications of the plurality of preliminary messages; and generate the expected program trace signal based on an average of the plurality of preliminary program trace signals generated in response to the plurality of communications of the preliminary messages.

In some embodiments, the plurality of preliminary messages intended to cause the at least one device processor to be idle can include one or more preliminary messages intended for other device processors connected to the communication network.

In some embodiments, the at least one communication of at least one test message can include a plurality of communications of a test message of the at least one test message; and the at least one monitoring processor can be operable to: generate an average collected program trace signal based on an average of the plurality of program trace signals generated in response to the plurality of communications of the test message; compare the average collected program trace signal to the expected response of the at least one device processor for the test message; and in response to determining that the average collected program trace signal does not correspond to the expected response, generate the anomaly notification.

In some embodiments, the system can further include an envelope generator to detect an active communication on the network that corresponds to a test message transmitted by the at least one monitoring processor; wherein the at least one monitoring processor can be operable to collect a program trace signal when the active communication is detected by the envelope generator.

In some embodiments, the at least one communication of at least one test message can include at least one communication of a plurality of test messages, wherein each of the plurality of test messages are different.

In some embodiments, the at least one monitoring processor can be operable to select the plurality of test messages randomly.

In some embodiments, the plurality of test messages can include at least one prior test message and a subsequent test message; and the at least one monitoring processor can be operable to select the subsequent test message based on whether a prior program trace signal corresponds to the expected response of the at least one device processor for the at least one prior test message, the prior program trace signal being generated by the at least one device processor in response to a communication of the at least one prior test message.

In some embodiments, the at least one monitoring processor can be operable to select a subsequent test message that is related to the at least one prior test message in response to determining that the prior program trace signal does not correspond to the expected response of the at least one device processor for the at least one prior test message.

In some embodiments, the subsequent test message can include a same command as that of the at least one prior test message and a different value from that of the at least one prior test message.

In some embodiments, the subsequent test message can include a related command as that of the at least one prior test message.

In some embodiments, the at least one side-channel can include one or more of a power consumption, an electromagnetic emission, a magnetic side-channel, an acoustic emanation, or an ultrasound emanation of the at least one device processor.

In another broad aspect, there is provided a method for monitoring a device processor connected to a communication network. The method can involve: operating a monitoring processor to transmit at least one communication of at least one test message to the at least one device processor on the communication network; for each communication, generating a program trace signal from at least one side-channel of the at least one device processor in response to the communication; and operating the at least one monitoring processor to: for each communication, collect a program trace signal generated by the at least one device processor in response to the communication; compare the at least one program trace signal to an expected response of the at least one device processor for the at least one test message to determine whether the at least one program trace signal corresponds to the expected response; and in response to determining that the at least one program trace signal does not correspond to the expected response, generate an anomaly notification.

In some embodiments, the method can involve operating the at least one monitoring processor to: determine whether at least one nominal channel of the at least one device processor is responsive to the communication; and in response to determining that the least one nominal channel is responsive to the communication, determine that the at least one program trace signal corresponds to the expected response.

In some embodiments, the at least one nominal channel can include one or more of an input of the at least one device processor or an output of the at least one device processor.

In some embodiments, the method can involve operating the at least one monitoring processor to: determine whether the at least one program trace signal corresponds to an expected program trace signal of the at least one device processor for the test message; and in response to determining that the at least one program trace signal does not correspond to the expected program trace signal, determine that the at least one program trace signal does not correspond to the expected response.

In some embodiments, the expected program trace signal can include a program trace signal of the at least one device processor when the at least one device processor is idle.

In some embodiments, the method can involve operating the at least one monitoring processor to: transmit a plurality of communications of a plurality of preliminary messages to the communication network, the plurality of preliminary messages intended to cause the at least one device processor to be idle; collect a plurality of preliminary program trace signals generated by the at least one device processor in response to the plurality of communications of the plurality of preliminary messages; and generate the expected program trace signal based on an average of the plurality of preliminary program trace signals generated in response to the plurality of communications of the preliminary messages.

In some embodiments, the plurality of preliminary messages intended to cause the at least one device processor to be idle can include one or more preliminary messages intended for other device processors connected to the communication network.

In some embodiments, the at least one communication of at least one test message can include a plurality of communications of a test message of the at least one test message; and the method can involve operating the at least one monitoring processor to: generate an average collected program trace signal based on an average of the plurality of program trace signals generated in response to the plurality of communications of the test message; compare the average collected program trace signal to the expected response of the at least one device processor for the test message; and in response to determining that the average collected program trace signal does not correspond to the expected response, generate the anomaly notification.

In some embodiments, the method can involve detecting an active communication on the network that corresponds to a test message transmitted by the at least one monitoring processor; and operating the at least one monitoring processor to collect a program trace signal when the active communication is detected.

In some embodiments, the at least one communication of at least one test message can include at least one communication of a plurality of test messages, wherein each of the plurality of test messages are different.

In some embodiments, the method can involve operating the at least one monitoring processor to select the plurality of test messages randomly.

In some embodiments, the plurality of test messages can include at least one prior test message and a subsequent test message; and the method can involve operating the at least one monitoring processor to select the subsequent test message based on whether a prior program trace signal corresponds to the expected response of the at least one device processor for the at least one prior test message, the prior program trace signal being generated by the at least one device processor in response to a communication of the at least one prior test message.

In some embodiments, the method can involve operating the at least one monitoring processor to select a subsequent test message that is related to the at least one prior test message in response to determining that the prior program trace signal does not correspond to the expected response of the at least one device processor for the at least one prior test message.

In some embodiments, the subsequent test message can include a same command as that of the at least one prior test message and a different value from that of the at least one prior test message.

In some embodiments, the subsequent test message can include a related command as that of the at least one prior test message.

In some embodiments, the at least one side-channel can include one or more of a power consumption, an electromagnetic emission, a magnetic side-channel, an acoustic emanation, or an ultrasound emanation of the at least one device processor.

BRIEF DESCRIPTIONS OF THE DRAWINGS

For a better understanding of the embodiments described herein and to show more clearly how they may be carried into effect, reference will now be made, by way of example only, to the accompanying drawings which show at least one exemplary embodiment, and in which.

Figure 3:
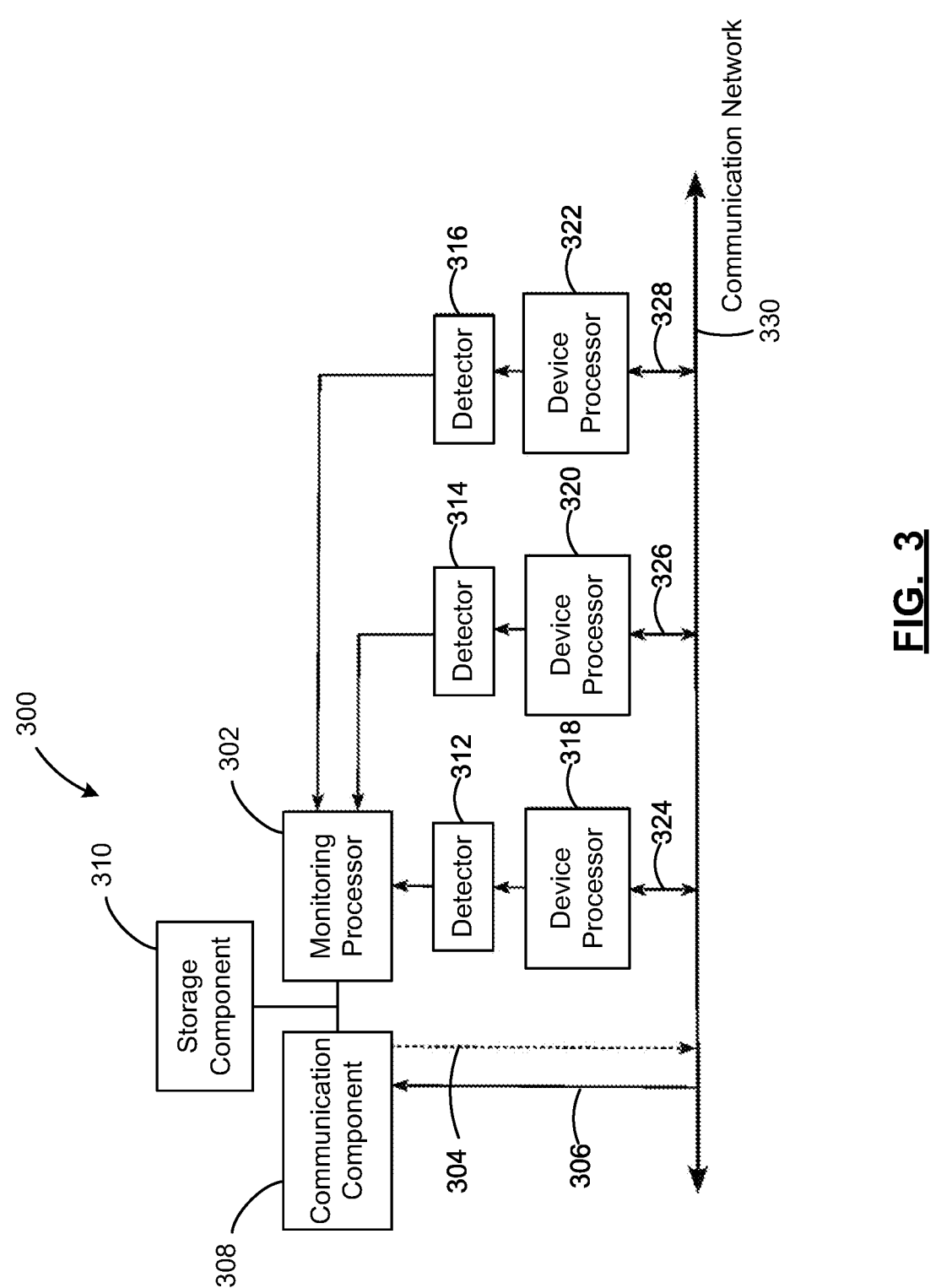
Figure 5:
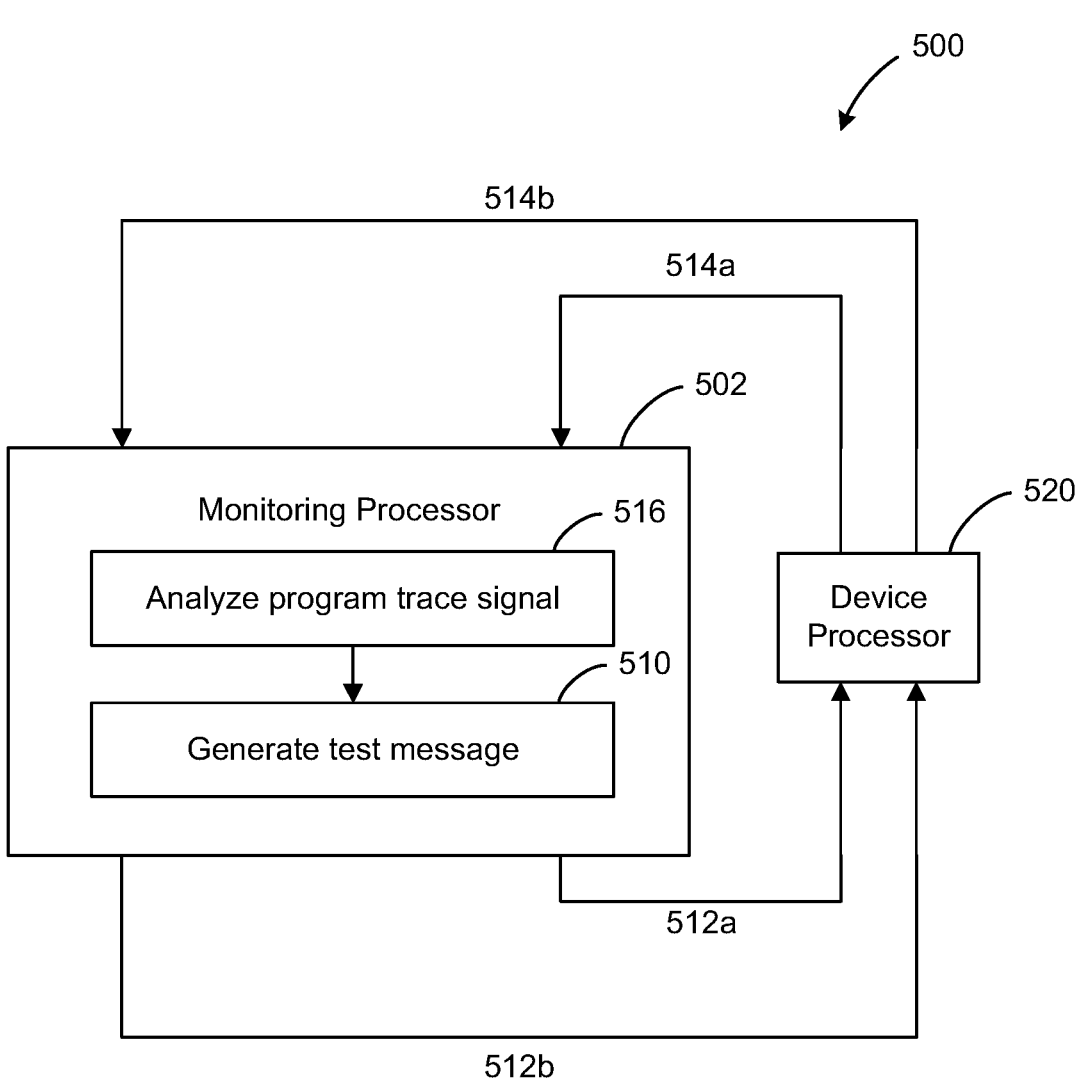

FIG. 3 depicts an example system for side-channel monitoring of a at least one device processor connected to a communication network, in accordance with at least one embodiment; and FIG. 4 depicts a flowchart of an example method for side-channel monitoring of at least one device processor connected to a communication network, in accordance with at least one embodiment; and FIG. 5 depicts a schematic of another example method for side-channel monitoring of at least one device processor, in accordance with at least one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

The various embodiments described herein generally relate to methods (and associated systems configured to implement the methods) for side-channel monitoring of at least one processor units connected to a communication network.

Side-channel monitoring involves capturing involuntary emissions (i.e., side-channels) of a processor (i.e., a processing unit), such as power consumption, electromagnetic (EM) emissions, magnetic field, acoustic, or ultrasound emanations. Power consumption, EM emission measurements, magnetic field measurements, acoustic emanation measurements, and ultrasound emanation measurements as a function of time can be referred to as power traces, EM emissions traces, magnetic traces, acoustic traces, or ultrasound traces.

Monitoring side-channels of a target computing system as it operates, that is, as it executes a program, allows for non-intrusive program tracing, or more generally, capturing program traces. The program traces can be correlated to program code executed by the target computing system or expected behavior of the electronic device during the program trace, in order to determine the events occurring on the target computing system executed.

Thus, data obtained from side-channel monitoring can be correlated to the internal state of the target computing system. Side-channel monitoring of a system can provide more reliable data about the target computer system than that obtained via primary channels of the target computing system. Data obtained from side-channel monitoring can be used instead of or in addition to data obtained from primary channels.

In a broad aspect, a target computing system connected to the communication network can be monitored to identify exceptions to normal behaviour of the computing system. Such exceptions to normal behaviour can be further investigated to uncover hidden functionality, security exploits, or safety violations of the processing units connected to the communication network.

In another broad aspect, a monitoring computing system connected to the communication network can transmit a test message over the communication network. A target computing system connected to the communication network can receive the message from the communication network. A program trace captured from the target computing system in the time following the communication can indicate how the target computing system processed the message. The monitoring computing system can determine whether the target computing system processed the message in an unexpected manner.

Figure 1:
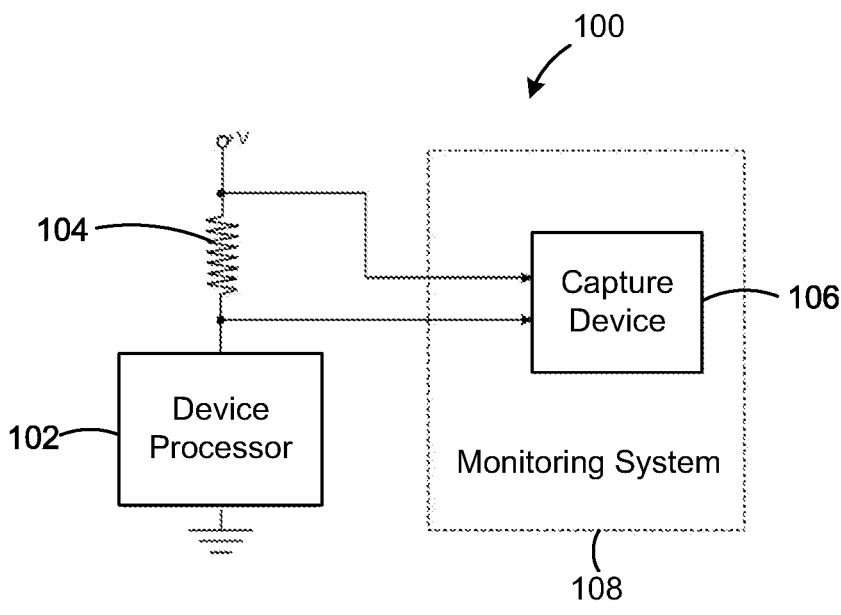
FIG. 1 depicts an example power-tracing detector for an embedded computing system, in accordance with at least one embodiment.

Referring to FIG. 1, shown therein is a diagram of a detector 100 for obtaining a power consumption program trace of a processor, that is, a device processor 102, in accordance with at least one embodiment. The device processor 102 can include any electronic device, computer-based device, computing system, or embedded computing system. In some embodiments, the device processor 102 can be a microprocessor, a memory chip, an interface circuit, a processing unit, a CPU, or an electronic control unit.

As shown in FIG. 1, the detector 100 includes a resistor 104 and a capture device 106. The resistor 104 can be placed in series with the power input line of the device processor 102. An analog signal indicative of the power consumption of the device processor 102, or the program trace, can be obtained by measuring current or voltage across the resistor 104.

The capture device 106 can measure current across the resistor 104 to obtain the program trace. In addition, the capture device 106 can digitize the program trace. In some embodiments, the capture device 106 can be a contactless current sensor. In some embodiments, the capture device 106 can include an analog-to-digital converter. In some embodiments, the capture device 106 can be a sound card, oscilloscope, or a digital oscilloscope. The program trace obtained by capture device 106 can be used by the monitoring system 108 for discovering undocumented functionality of the device processor 102.

Figure 2:
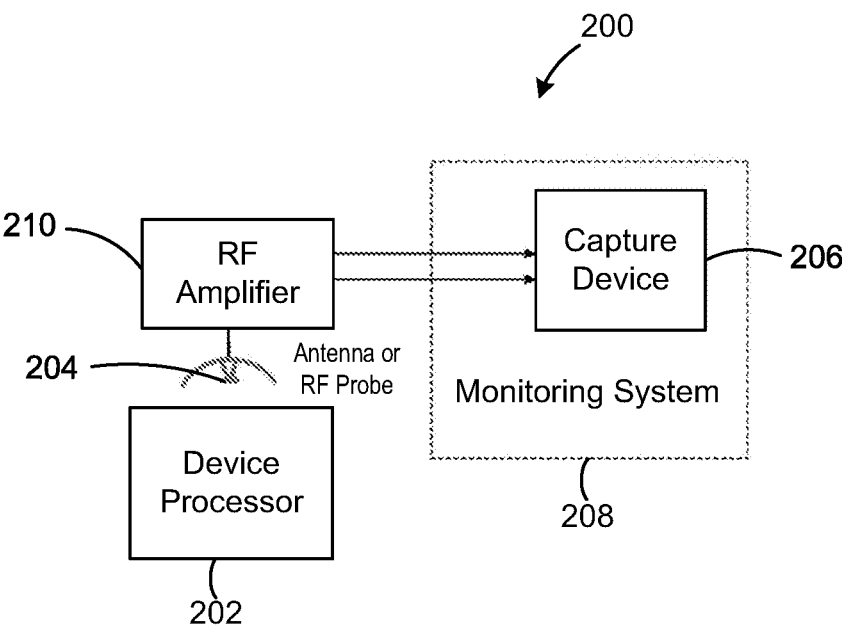
FIG. 2 depicts an example electromagnetic emissions tracing detector for an embedded computing system, in accordance with at least one embodiment.

Referring to FIG. 2, shown therein is a diagram of a detector 200 for obtaining an electromagnetic emissions program trace of a processor, that is, a device processor 202, in accordance with at least one embodiment. The device processor 202 can include any electronic device, computer-based device, computing system, or embedded computing system. In some embodiments, the device processor 202 can be a microprocessor, a memory chip, an interface circuit, a processing unit, a CPU, or an electronic unit.

As shown in FIG. 2, the detector includes a radiofrequency (RF) probe, or antenna 204, an RF amplifier 210, and a capture device 206. The antenna 204 can be placed in the vicinity of the device processor 202 to detect electromagnetic emissions of the device processor 202. In some embodiments, additional signal conditioning is required in order to provide a signal within the operating range of the capture device 206. In some embodiments, the antenna 204 can be cascaded with an RF amplifier 210 to increase the strength of the signal from the antenna 204.

The capture device 206 can measure the output voltage across the antenna 204 in order to obtain the program trace. In addition, the capture device 206 can digitize the program trace. In some embodiments, the capture device 206 can be a contactless current sensor. In some embodiments, the capture device 206 can include an analog-to-digital converter. In some embodiments, the capture device 206 can be a sound card, oscilloscope, or a digital oscilloscope. The program trace obtained by capture device 206 is used by the monitoring system 208 for discovering undocumented functionality of the device processor 202. Although not shown in FIG. 2, the monitoring system 208 can include a monitoring processor, a communication component, and a storage component.

Referring to FIG. 3, shown therein is a diagram of a system 300 for side-channel monitoring of at least one processor connected to a communication network 330, in accordance with at least one embodiment. The system 300 includes a monitoring processor 302, a communication component 308, a storage component 310, and detectors 312, 314, 316. In some embodiments, each of the monitoring processor 302, the storage component 310 and the communication component 308 may be combined into a fewer number of components or may be separated into further components.

The monitoring processor 302 may be any suitable processors, controllers, digital signal processors, graphics processing units, application specific integrated circuits (ASICs), field programmable gate arrays (FPGAs), microcontrollers, and/or other suitably programmed or programmable logic circuits that can provide sufficient processing power depending on the configuration, purposes and requirements of the monitoring system 302. In some embodiments, the monitoring processor 302 can include more than one processor with each processor being configured to perform different dedicated tasks.

The monitoring processor 302 can be configured to control the operation of the monitoring system 300. The monitoring processor 302 can include modules that initiate and manage the operations of the monitoring system 300. The monitoring processor 302 can also determine, based on received data, stored data and/or user preferences, how the monitoring system 300 may generally operate. The monitoring processor 302 can receive and analyze side-channel data, generate and transmit notifications via the communication component 308, or store program trace data, and notifications on the storage component 310. The monitoring processor 302 can implement various types of processing such as, but not limited to, digital signal processing, statistical signal processing, statistical pattern recognition, correlation analysis, mutual information analysis, system identification, etc.

The communication component 308 can be any interface that enables the monitoring system 300 to communicate with other devices and systems. In some embodiments, the communication component 308 can include at least one of a serial port, a parallel port or a USB port. The communication component 308 may also include at least one of a CAN bus, an Internet, Local Area Network (LAN), Ethernet, Firewire™, modem, fiber, or digital subscriber line connection. Various combinations of these elements may be incorporated within the communication component 308.

For example, the communication component 308 can receive input from various input devices, such as a mouse, a keyboard, a touch screen, a thumbwheel, a track-pad, a track-ball, a card-reader, voice recognition software and the like depending on the requirements and implementation of the monitoring system.

The storage component 310 can include RAM, ROM, one or more hard drives, one or more flash drives or some other suitable data storage elements such as disk drives, etc. The storage component 310 can be used to store an operating system and programs, for example. For instance, the operating system provides various basic operational processes for the monitoring processor 302. The programs include various user programs so that a user can interact with the processor to perform various functions such as, but not limited to, retrieving expected program trace samples as the case may be.

In some embodiments, the storage component 310 can store the program trace signals, information related to the program trace signals, messages, and information related to the messages. The storage component 310 can include one or more databases (not shown) for storing expected program trace samples, information related to the device processors 318, 320, and 322, and information related to the detectors 312, 314, 316.

For example, when receiving a message, the input and output activity in a device processor will cause a distinct pattern in the power consumption and other side-channels such as electromagnetic emissions. By analyzing the power consumption (or other side-channels) pattern of the device processor in the period of time immediately following the communication of the message, it can be determined whether the device processor exhibits a pattern in power consumption or other side-channels consistent with the normal reaction (execution) to the received command data of the message.

In this example, three device processors 318, 320, and 322 are connected 324, 326, and 328 to the communication network 330. Each of the device processors 318, 320, 322 can include any electronic device, computer-based device, computing system, or embedded computing system. In some embodiments, each of the device processors 318, 320, and 322 can be a microprocessor, a memory chip, an interface circuit, a processing unit, a CPU, or an electronic control unit. Although three device processors 318, 320, and 322 are shown in FIG. 3 as being connected to the communication network 330, fewer or more device processors 318, 320, and 322 can be connected to the communication network 330. Furthermore, although the system 300 is shown in FIG. 3 as monitoring all device processors 318, 320, and 322 connected to the communication network 330, the system 300 can monitor only some of device processors 318, 320, and 322 connected to the communication network 330.

The communication network 130 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX™), Signaling System No. 7 (SS7) signaling network, fixed line, local area network, wide area network, controller area network (CAN) bus, and others, including any combination of these, capable of interfacing with, and enabling communication between the monitoring system 300 and the device processors 318, 320, and 322.

Although the monitoring system 300 is shown in FIG. 3 as being connected 304, 306 to the communication network 330, in some embodiments, communications 304 from the monitoring system 300 to device processors 318, 320, and 322 can be indirect. For example, in some embodiments, communications 304 from the monitoring system 300 can be encrypted, via a virtual private network (VPN), or via another communication network (e.g., wireless communication, LTE, Wi-Fi, or a separate local network).

The detectors 312, 314, 316 can obtain program traces of the device processors 318, 320, and 322 connected to the communication network 330. Each of detectors 312, 314, 316 can be any type of detector. For example, one or more of detectors 312, 314, 316 can obtain a power program trace, an EM program trace, a magnetic program trace, an acoustic program trace, or an ultrasound program trace. Any combination of types of detectors 312, 314, 316 can be used to capture multiple program traces. For example, detector 312 can capture a power program trace of device processor 318, while detector 314 can capture an EM program trace of device processor 320, while detector 316 can capture an acoustic program trace of device processor 322.

The system 300 shown in FIG. 3 includes a detector 312, 314, 316 for each of the device processors 318, 320, and 322, respectively. That is, each detector 312, 314, 316 includes a single probe to capture a single program trace, similar to detectors 100 and 200. However, in some embodiments, a detector 312, 314, 316 can include multiple probes to capture multiple program traces from multiple device processors 318, 320, and 322. Furthermore, in some embodiments, multiple program traces for a single device processor 318, 320, and 322 can be captured. For example, both a power program trace and a magnetic program trace can be captured for a single device processor 318, 320, and 322.

Referring now to FIG. 4, an example method 400 of monitoring at least one device processor connected to a communication network is shown in a flowchart diagram. To assist with the description of the method 400, reference will be made simultaneously to FIG. 1 to FIG. 3.

At 410, at least one monitoring processor, such as monitoring processor 302, is operated to transmit at least one communication of at least one message to at least one device processor on a communication network, such as communication network 330. Although reference will be made to device processor 318, the device processor can be any one of device processors 102, 202, 318, 320, and 322 connected to the communication network 330. Each of the monitoring processor 302 and the device processors 318, 320, 322 can transmit and receive messages over the communication network 330.

In some embodiments, the monitoring processor 302 can transmit a single communication of a test message to the device processor, such as device processor 318. In other embodiments, the monitoring processor 302 can transmit a plurality of communications of a test message to the device processor 318. That is, the monitoring processor 302 can transmit a same test message multiple times to the device processor 318.

In some embodiments, the monitoring processor 302 can transmit different test messages to the device processor 318. Test messages can differ in content, such as a command or the value associated with a command. For example, a first test message can relate to a read command and a second test message can relate to a write command. In another example, the first test message can relate to a write command with a first value and the second test message can relate to a write command with a second value.

In some embodiments, the device processor 318 can be associated with a pre-determined command language. That is, the command language of the device processor 318 can be known to the monitoring processor 302. Accordingly, the monitoring processor 302 can generate the commands in any command language suitable for the device processor 318.

The monitoring processor 302 can transmit a plurality of communications of a plurality of test messages in any order. For example, the monitoring processor 302 can transmit a plurality of a first test message, followed by a plurality of second test messages. In another example, the monitoring processor 302 can transmit a first test message and a second test message, followed by additional iterations of the first test message and the second test message.

In some embodiments, the monitoring processor 302 can select the at least one test message randomly. In some embodiments, the monitoring processor 302 can select a subsequent test message based on a prior-transmitted test message.

At 420, at least one detector, such as example detectors 106, 206, 312, 314, and 316, generate a program trace signal. The program trace signal can be obtained from a at least one side-channel of the device processor 318. As the device processor 318 operates, a distinct pattern is generated in the power consumption, the magnetic field, and other side-channels such as electromagnetic emissions, acoustic emanations, and ultrasound emanations. The distinct pattern of the side-channels of the device processor 318 can be correlated to the activity on the device processor 318.

In some embodiments, the program trace signal can be derived from the power consumption of the device processor 102, such as that obtained by detector 100 via the resistor 104. In some embodiments, the program trace signal can be derived from electromagnetic emissions of the device processor 202, such as that obtained by detector 206 via radio frequency probe 204 and radio frequency amplifier 210. In some embodiments, the program trace signal can be derived from acoustic emanations of the device processor 318. In some embodiments, the program trace signal can be derived from the magnetic field of the device processors 318. In some embodiments, the program trace signal can be derived from ultrasound emanations of the device processors 318.

At 430, the monitoring processor 302 is operated to, for each communication, collect a program trace signal generated by the device processor 318 in response to the communication transmitted by the monitoring processor 302 at 410.

In some embodiments, the monitoring processor 302 can continuously collect the at least one program trace signal for the device processor 318. In some embodiments, the monitoring processor 302 can collect the program trace signal generated by the device processor 318 in response to each communication of the test message and generate an average collected program trace signal based on the plurality of program trace signals collected. The average can be any appropriate average, including mean, median or mode.

The average collected program trace signal can remove noise in the collected program trace signals, thus better reflect the underlying program trace signal in response to the test message. The program trace signal can be inherently noisy. For example, with a device processor of an embedded computing system, the side-channel of an entire target board (e.g., embedded computing system) can be collected, not just the side-channel of the device processor therein. In addition, it is possible that other system activity can occur at the same time as the collection of a program trace signal by coincidence. Using the average collected program trace signal can also remove such uncorrelated events.

Due to bus negotiation, the relative time between the dispatch of a message by the monitoring processor 302 to the communication network 330 and the presence of the physical message bits on the communication network 330 can vary. To address the varying time difference, in some embodiments, the method 300 can involve detecting message activity, that is, an active communication on the communication network 330. The monitoring processor 302 can collect a program trace signal when the active communication is detected.

In some embodiments, an envelope generator can be used to monitor the communication network 330 for the message activity. The envelop generator can output an envelope waveform when there is an active message on the communication network 330.

Furthermore, in some embodiments, the method 300 can involve determining whether the message activity corresponds to the test message transmitted by the monitoring processor 302. The monitoring processor 302 can collect a program trace signal when the active communication corresponding to the test message is detected. In the case of a CAN bus, the envelope generator can determine whether the active CAN message on the CAN bus matches the CAN identification number of the test message.

At 440, the monitoring processor 302 is operated to compare the program trace signal to an expected response of the device processor 318 for the at least one test message to determine whether the program trace signal corresponds to the expected response. That is, the monitoring processor 302 is operated to analyze the program trace signal obtained at 430.

In some embodiments, the expected response can be associated with a pre-determined response window length. That is, the response time of the device processor 318 can be known to the monitoring processor 302. Accordingly, the monitoring processor 318 can collect program trace signals of the pre-determined response window length for comparison with the expected response.

When multiple communications of a same message are transmitted, the monitoring processor 302 can compare the average collected program trace signal to the expected response of the device processor 318 for the test message. In response to determining that the average collected program trace signal does not correspond to the expected response, the monitoring processor 302 can generate the anomaly notification.

In some embodiments, the expected response to the test message can relate to a response exhibited on a nominal channel, that is, a conventional channel of the device processor 318. For example, a nominal channel of the device processor 318 can include but is not limited to an input of the device processor 318, or an output of the device processor 318. The monitoring processor 302 can determine whether at least one nominal channel of the device processor 318 is responsive to the test message. In response to determining that the least one nominal channel is responsive to the test message, the monitoring processor 302 can determine that the at least one program trace signal corresponds to the expected response.

In some embodiments, the expected response may not relate to a nominal channel of the device processor 318. That is, the expected response may not manifest on a nominal channel. For example, the expected response can involve reading or writing to internal memory or flash storage, or altering the execution state of the system firmware. Thus, the expected response can relate to an expected program trace signal of the device processor 318 for the test message. In some embodiments, the program trace signal in response to a message can be quantified by the number of additional CPU cycles taken in the instruction path. In some embodiments, the program trace signal in response to a message can be quantified by the number of machine words written to or read from internal memory or flash storage. For example, the expected program trace signal can be a program trace signal of the device processor 318 when the device processor 318 is idle. Other expected program trace signals are possible.

In some embodiments, the expected response can be based on the plurality of test messages. Test messages can include a command that is idempotent—that is, a single command that is a toggle. With idempotent commands, a full response can be induced in an initial instance of the idempotent command and subsequent instances of the same idempotent command can involve checking the internal state to verify that the additional iteration should not produce the original full response. The expected program trace signal of toggling in response to the initial instance of the idempotent command is different from the expected program trace signal of checking the internal state in subsequent instances of the same idempotent command.

The monitoring processor 302 can determine whether the program trace signal corresponds to the expected program trace signal. For example, a program trace signal that is statistically significantly different from the expected program trace signal can be considered as not corresponding to the expected program trace signal. Other methods are possible too. For example, a machine-learning model can also be used to determine whether a program trace signal corresponds to the expected program trace signal. In response to determining that the program trace signal does not correspond to the expected program trace signal, the monitoring processor 302 can determine that the program trace signal does not correspond to the expected response.

The expected program trace signal can be pre-determined. In some embodiments, the monitoring processor 302 can receive the expected program trace signal from memory. In other embodiments, the monitoring processor 302 can determine the expected program trace signal prior to 310.

To determine the expected program trace signal, a processor, such as the monitoring processor 302, can transmit a plurality of communications of a plurality of preliminary messages to the communication network 330. The plurality of preliminary messages can be intended to cause the device processor 318 to be idle. For example, the preliminary messages can be intended for other device processors 320, 322 connected to the communication network 330. That is, the preliminary messages can indicate an intended recipient other than device processor 318.

The monitoring processor 302 can collect a plurality of preliminary program trace signals generated by the device processor 318 in response to the plurality of preliminary messages. The monitoring processor 302 can generate the expected program trace signal based on an average of the plurality of preliminary program trace signals generated in response to the preliminary messages. The average can be any appropriate average, including mean, median or mode.

In some embodiments, the expected program trace signal can determined using statistical or machine-learning approaches.

At 450, the monitoring processor 302 is operated to generate an anomaly notification in response to determining that the program trace signal does not correspond to the expected response. The anomaly notification can be reported to a user and/or transmitted to a user processor connected to the communication network 330.

It will be appreciated that the method 400 does not require prior knowledge of the interaction between the collected power trace signal (e.g., observed powertrace) and the target system. In particular, the method 400 does not require an explicit model to reconstruct the desired information from the observed power trace. Instead, such method 400 uses a statistical or machine-learning approach to extract information from the power trace signal without an explicit model.

Referring now to FIG. 5, shown therein is a schematic diagram of another example method 500 for side-channel monitoring of at least one device processor 520, in accordance with at least one embodiment. Similar to method 400, the method 500 can be implemented by a monitoring system having a monitoring processor 502, a communication component, storage component, and a detector (not shown in FIG. 5).

As shown in FIG. 5, the monitoring processor 502 can generate 510 an initial test message 512*a*, similar to 410. Generating the initial test message 512*a* can involve selecting the initial test message 512*a* from a plurality of test messages. The monitoring processor 502 can transmit the initial test message 512*a* to the device processor 520.

The response of the device processor 520 to the initial test message 512*a* can be observed. Similar to 420, the detector can generate an initial program trace signal 514*a* of the response of the device processor 520 to the initial test message 512*a*. The initial program trace signal 514*a* can be transmitted to the monitoring processor 502.

As shown in FIG. 5, the monitoring processor 502 can collect the initial program trace signal 514*a*, similar to 430. The monitoring processor 502 can analyze 516 the initial program trace signal 514*a* and generate 510 a subsequent test message 512*b*. The monitoring processor 502 can transmit the subsequent test message 512*b* to the device processor 520, similar to the initial test message 512*a*.

In some embodiments, the monitoring processor 502 can select the subsequent test message 512*b* based on whether the initial program trace signal 514*a* corresponds to an expected response of the device processor 520 for the prior-transmitted test message, that is, the initial test message 512*a*. In particular, the monitoring processor 502 can select a subsequent test message 512*b* that is related or similar to the prior test message 512*a* in response to determining that the prior program trace signal 514*a* did not correspond to the expected response for the prior test message. For example, a first test message 512*a* can relate to a read command with a first value. In response to determining that the program trace signal 514*b* in response to the first test message 512*a* does not correspond to the expected response of the first test message 512*a*, the monitoring processor 502 can select a subsequent test message 512*b* with a same read command but with a value different from the first value.

The response of the device processor 520 to the subsequent test message 512*b* can be observed. Similar to 420, the detector can generate a subsequent program trace signal 514*b* of the response of the device processor 520 to the subsequent test message 512*b*. The subsequent program trace signal 514*b* can be transmitted to the monitoring processor 502.

As shown in FIG. 5, the generation and transmission 510 of a test message 512*a*, 512*b* (collectively referred to herein as 512) and collection and analysis of a program trace signal 514*a*, 514*b* (collectively referred to herein as 514) in response to the test messages 512 can be reiterated any number of times. Furthermore, the generation of a test message 512 can be based on a program trace signal 514 in response to a prior test message.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A system for monitoring at least one device processor connected to a communication network, the system comprising:

at least one detector configured to generate a program trace signal from at least one side-channel of the at least one device processor;

a communication component to provide access to the communication network; and at least one monitoring processor in communication with the communication component and the at least one detector, the at least one monitoring processor being configured to:

transmit at least one communication of at least one test message to the at least one device processor via the communication network, wherein the at least one communication of at least one test message comprises at least one communication of a plurality of test messages, the plurality of test messages comprise at least one prior test message and a subsequent test message;

for each communication, collect a program trace signal generated by the at least one device processor in response to the communication;

compare the at least one program trace signal to an expected response of the at least one device processor for the at least one test message to determine whether the at least one program trace signal corresponds to the expected response;

in response to determining that the at least one program trace signal does not correspond to the expected response, generate an anomaly notification; and select the subsequent test message based on whether a prior program trace signal corresponds to the expected response of the at least one device processor for the at least one prior test message, the prior program trace signal being generated by the at least one device processor in response to a communication of the at least one prior test message.

2. The system of claim 1, wherein the at least one monitoring processor is configured to:

determine whether at least one nominal channel of the at least one device processor is responsive to the communication; and in response to determining that at least one nominal channel is responsive to the communication, determine that the at least one program trace signal corresponds to the expected response.

3. The system of claim 2, wherein the at least one nominal channel comprises one or more of an input of the at least one device processor or an output of the at least one device processor.

4. The system of claim 1, wherein the at least one monitoring processor is configured to:

determine whether the at least one program trace signal corresponds to an expected program trace signal of the at least one device processor for the test message; and in response to determining that the at least one program trace signal does not correspond to the expected program trace signal, determine that the at least one program trace signal does not correspond to the expected response.

5. The system of claim 4, wherein the expected program trace signal comprises a program trace signal of the at least one device processor when the at least one device processor is idle.

6. The system of claim 4, wherein the at least one monitoring processor is configured to:

transmit a plurality of communications of a plurality of preliminary messages to the communication network, the plurality of preliminary messages intended to cause the at least one device processor to be idle;

collect a plurality of preliminary program trace signals generated by the at least one device processor in response to the plurality of communications of the plurality of preliminary messages; and generate the expected program trace signal based on an average of the plurality of preliminary program trace signals generated in response to the plurality of communications of the preliminary messages.

7. The system of claim 6, wherein the plurality of preliminary messages intended to cause the at least one device processor to be idle comprise one or more preliminary messages intended for other device processors connected to the communication network.

8. The system of claim 1, wherein:

the at least one communication of at least one test message comprises a plurality of communications of a test message of the at least one test message; and the at least one monitoring processor is configured to:

generate an average collected program trace signal based on an average of the plurality of program trace signals generated in response to the plurality of communications of the test message;

compare the average collected program trace signal to the expected response of the at least one device processor for the test message; and in response to determining that the average collected program trace signal does not correspond to the expected response, generate the anomaly notification.

9. The system of claim 1, further comprising an envelope generator to detect an active communication on the network that corresponds to a test message transmitted by the at least one monitoring processor; wherein the at least one monitoring processor is configured to collect a program trace signal when the active communication is detected by the envelope generator.

10. The system of claim 1, wherein the at least one monitoring processor is configured to select the plurality of test messages randomly.

11. The system of claim 1, wherein the at least one monitoring processor is operable configured to select a subsequent test message that is related to the at least one prior test message in response to determining that the prior program trace signal does not correspond to the expected response of the at least one device processor for the at least one prior test message.

12. The system of claim 11, wherein the subsequent test message comprises a same command as that of the at least one prior test message and a different value from that of the at least one prior test message.

13. The system of claim 11, wherein the subsequent test message comprises a related command as that of the at least one prior test message.

14. The system of claim 1, wherein the at least one side-channel comprises one or more of a power consumption, an electromagnetic emission, a magnetic side-channel, an acoustic emanation, or an ultrasound emanation of the at least one device processor.

15. A method for monitoring at least one device processor connected to a communication network, the method comprising:

operating at least one monitoring processor to transmit at least one communication of at least one test message to the at least one device processor via the communication network wherein the at least one communication of at least one test message comprises at least one communication of a plurality of test messages, the plurality of test messages comprise at least one prior test message and a subsequent test message;

for each communication, generating a program trace signal from at least one side-channel of the at least one device processor in response to the communication; and operating the at least one monitoring processor to:

for each communication, collect a program trace signal generated by the at least one device processor in response to the communication;

compare the at least one program trace signal to an expected response of the at least one device processor for the at least one test message to determine whether the at least one program trace signal corresponds to the expected response;

in response to determining that the at least one program trace signal does not correspond to the expected response, generate an anomaly notification; and select the subsequent test message based on whether a prior program trace signal corresponds to the expected response of the at least one device processor for the at least one prior test message, the prior program trace signal being generated by the at least one device processor in response to a communication of the at least one prior test message.

16. The method of claim 15, comprising operating the at least one monitoring processor to:

determine whether at least one nominal channel of the at least one device processor is responsive to the communication; and in response to determining that the least one nominal channel is responsive to the communication, determine that the at least one program trace signal corresponds to the expected response.

17. The method of claim 16, wherein the at least one nominal channel comprises one or more of an input of the at least one device processor or an output of the at least one device processor.

18. The method of claim 15, comprising operating the at least one monitoring processor to:

determine whether the at least one program trace signal corresponds to an expected program trace signal of the at least one device processor for the test message; and in response to determining that the at least one program trace signal does not correspond to the expected program trace signal, determine that the at least one program trace signal does not correspond to the expected response.

* * * * *